US012608313B2

(12) United States Patent
Stephens et al.

(10) Patent No.: US 12,608,313 B2
(45) Date of Patent: Apr. 21, 2026

(54) GARBAGE COLLECTION IN CONSTRAINED LOCAL ENVIRONMENTS

(71) Applicant: Microsoft Technology Licensing, LLC, Redmond, WA (US)

(72) Inventors: Maoni Zhang Stephens, Kirkland, WA (US); Brendan Davis Burns, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 18/301,852

(22) Filed: Apr. 17, 2023

(65) Prior Publication Data

US 2024/0345952 A1     Oct. 17, 2024

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC ..................... G06F 12/0253; G06F 2212/7205
USPC ........................................................ 711/166
See application file for complete search history.

(56) References Cited

U.S. PATENT DOCUMENTS

| | | | | |
|---|---|---|---|---|
| 6,910,213 B1* | 6/2005 | Hirono | ...................... | G06F 9/52 |
| | | | | 718/108 |
| 9,619,158 B2* | 4/2017 | Haas | ................... | G06F 12/0253 |
| 2005/0198088 A1* | 9/2005 | Subramoney | ....... | G06F 16/2308 |

| | | | | |
|---|---|---|---|---|
| 2007/0136402 A1* | 6/2007 | Grose | ................. | G06F 12/0253 |
| 2014/0082030 A1* | 3/2014 | Burka | ................. | G06F 12/0253 |
| | | | | 707/815 |
| 2014/0281338 A1* | 9/2014 | Choi | ..................... | G06F 3/0688 |
| | | | | 711/170 |
| 2016/0239413 A1 | 8/2016 | Stephens et al. | | |
| 2016/0306739 A1 | 10/2016 | Stephens et al. | | |
| 2018/0143892 A1 | 5/2018 | Au et al. | | |
| 2018/0217779 A1 | 8/2018 | Stephens et al. | | |
| 2018/0217927 A1 | 8/2018 | Stephens et al. | | |
| 2019/0179565 A1* | 6/2019 | Mainali | ............... | G06F 12/0253 |
| 2019/0294540 A1* | 9/2019 | Bobroff | ................. | G06F 3/0604 |
| 2019/0384703 A1 | 12/2019 | Stephens et al. | | |

(Continued)

OTHER PUBLICATIONS

Garbage Collection in a Distributed Object-Oriented System (Year: 1993).*

(Continued)

*Primary Examiner* — Yaima Rigol
(74) *Attorney, Agent, or Firm* — Wade IP Law PLLC

(57) ABSTRACT

Embodiments control garbage collection priority based on both a local memory pressure and a global memory pressure. The local pressure represents volatile memory usage in a container or other isolation unit residing on a machine, and the global pressure represents volatile memory usage in the machine overall. The machine is a device or a virtual machine containing one or more isolation units. Each isolation unit has a low threshold and a high threshold, and the machine has its own low threshold and its own high threshold. Garbage collection execution priority is set to low, normal, or high, depending on the memory pressures and the thresholds. By basing garbage collection timing and performance on both local pressure and global pressure, embodiments optimize garbage collection efficiency, especially in memory overcommitment scenarios.

20 Claims, 4 Drawing Sheets

ENHANCED SYSTEM 102, 202 WITH GARBAGE COLLECTOR MIXED ENVIRONMENT PRESSURES RESPONSE FUNCTIONALITY 204

MEMORY/MEDIA 112, 114

CONTROLLER 134 TO PRIORITIZE 302 GARBAGE COLLECTION 132 PER GLOBAL MEMORY PRESSURE 304 AND LOCAL MEMORY PRESSURE 306

LOCAL LOW THRESHOLD 308, LOCAL HIGH THRESHOLD 310, GLOBAL HIGH THRESHOLD 314

GLOBAL LOW THRESHOLD 312

PROCESSOR 110    MACHINE MAX CAPACITY 316    INTERFACE(S) 318

(56) References Cited

U.S. PATENT DOCUMENTS

| | | | |
|---|---|---|---|
| 2019/0384705 | A1 | 12/2019 | Stephens et al. |
| 2020/0409839 | A1 | 12/2020 | Stephens et al. |
| 2021/0191859 | A1 | 6/2021 | Stephens et al. |
| 2021/0208954 | A1 | 7/2021 | Stephens et al. |
| 2021/0303462 | A1 * | 9/2021 | Micic ................ G06F 12/0802 |
| 2021/0357139 | A1 * | 11/2021 | Reynolds ............ G06F 3/0604 |
| 2024/0126462 | A1 * | 4/2024 | Kim ..................... G06F 3/0652 |

OTHER PUBLICATIONS

"Runtime configuration options for garbage collection", retrieved from << https://learn.microsoft.com/en-us/dotnet/core/runtime-config/garbage-collector >>, Feb. 14, 2023, 22 pages.

"Number of .net Garbage Collector Threads", retrieved from << https://stackoverflow.com/questions/6857375/number-of-net-garbage-collector-threads >>, Aug. 20, 2011, 2 pages.

Rafal Kuć, "A Step-by-Step Guide to Java Garbage Collection Tuning", retrieved from << https://sematext.com/blog/java-garbage-collection-tuning/ >>, Jan. 14, 2020, 25 pages.

"6 The Parallel Collector", retrieved from << https://docs.oracle.com/javase/8/docs/technotes/guides/vm/gctuning/parallel.html >>, no later than Mar. 9, 2023, 3 pages.

Eva Andreasson, et al., "To Collect or Not to Collect? Machine Learning for Memory Management", retrieved from << https://www.usenix.org/legacy/events/javavm02/full_papers/andreasson/andreasson.pdf >>, Aug. 1-2, 2002, 14 pages.

"Reinforcement learning", retrieved from << https://en.wikipedia.org/wiki/Reinforcement_learning >>, Mar. 4, 2023, 15 pages.

"Garbage collection (computer science)", retrieved from << https://en.wikipedia.org/wiki/Garbage_collection (computer_science) >>, Jan. 29, 2023, 10 pages.

"PID controller", retrieved from << https://en.wikipedia.org/wiki/PID_controller >>, Feb. 24, 2023, 29 pages.

"Burstiness", retrieved from << https://en.wikipedia.org/wiki/Burstiness >>, Dec. 12, 2022, 2 pages.

"Fano factor", retrieved from << https://en.wikipedia.org/wiki/Fano_factor >>, Mar. 4, 2023, 4 pages.

"How to calculate burstiness?", retrieved from << https://stats.stackexchange.com/questions/20757/how-to-calculate-burstiness >>, Jan. 8, 2012, 2 pages.

"[.net Internals 06] Generational garbage collection", retrieved from << https://www.codejourney.net/net-internals-06-generational-garbage-collection/ >>, Aug. 29, 2018, 13 pages.

Jonathan Allen, ".net 7 Adds Aggressive Garbage Collection for Kubernetes", retrieved from << https://www.infoq.com/news/2022/11/GCCollectionMode-Aggressive/ >>, Nov. 22, 2022, 4 pages.

"[API Proposal]: Let the application author tell us to be idle. #66037", retrieved from << https://github.com/dotnet/funtime/issues/66037 >>, Mar. 1, 2022, 5 pages.

"Aggressive garbage collector strategy", retrieved from << https://stackoverflow.com/questions/7980177/aggressive-garbage-collector-strategy >>, Nov. 2, 2011, 7 pages.

"Cgroups", retrieved from << https://en.wikipedia.org/wiki/Cgroups >>, Feb. 7, 2023, 7 pages.

"Checking kubernetes pod CPU and memory", retrieved from << https://stackoverflow.com/questions/54531646/checking-kubernetes-pod-cpu-and-memory >>, Feb. 5, 2019, 11 pages.

"Containerization (computing)", retrieved from << https://en.wikipedia.org/wiki/Containerization_(computing) >>, Jan. 28, 2023, 3 pages.

"Docker (software)", retrieved from << https://en.wikipedia.org/wiki/Docker_(software) >>, Mar. 7, 2023, 8 pages.

"Job Objects", retrieved from << https://learn.microsoft.com/en-us/windows/win32/procthread/job-objects?redirectedfrom=MSDN >>, Jan. 7, 2021, 5 pages.

"K9s", retrieved from << https://k9scli.io/ >>, no later than Dec. 31, 2020, 7 pages.

"Command line tool (kubectl)", retrieved from << https://kubernetes.io/docs/reference/kubectl/_print/ >>, no later than Mar. 25, 2023, 42 pages.

"Kubernetes", retrieved from << https://en.wikipedia.org/wiki/Kubernetes >>, Mar. 11, 2023, 17 pages.

Sandeep Dinesh, "Kubernetes best practices: Resource requests and limits", retrieved from << https://cloud.google.com/blog/products/containers-kubernetes/kubernetes-best-practices-resource-requests-and-limits >>, May 11, 2018, 14 pages.

Emily Chang, "Monitor Java memory management with runtime metrics, APM, and logs", retrieved from << https://www.datadoghq.com/blog/java-memory-management/ >>, Oct. 2, 2019, 21 pages.

"Out of memory", retrieved from << https://en.wikipedia.org/wiki/Out_of_memory >>, Jan. 23, 2023, 3 pages.

"Making Garbage Collection faster", retrieved from << https://www.dynatrace.com/resources/ebooks/javabook/making-garbage-collection-faster/ >>, no later than Mar. 24, 2023, 8 pages.

"Cloud Native: Support Dynamic Configuration in .net GC #79658", retrieved from << https://github.com/dotnet/runtime/issues/79658 >>, Dec. 14, 2022, 2 pages.

"Kubelet Configuration (v1beta1): Kubernetes", Retrieved from the URL: https://web.archive.org/web/20230316051420/https://kubernetes.io/docs/reference/config-api/kubelet-config.vlbeta1/, Mar. 16, 2023, 18 Pages.

Chandra, et al., "Deterministic Container Resource Management in Derivative Clouds", In 2018 IEEE International Conference on Cloud Engineering (IC2E), Apr. 17, 2018, pp. 79-89.

Heo, Tejun, "Control Group v2", Retrieved from the URL: https://www.kernel.org/doc/html/latest/admin-guide/cgroup-v2.html, Oct. 1, 2015, 49 Pages.

International Search Report and Written Opinion received for PCT Application No. PCT/US2024/023479, Aug. 14, 2024, 18 pages.

International Preliminary Report on Patentability (Chapter I) received for PCT Application No. PCT/US2024/023479, mailed on Oct. 30, 2025, 12 Pages.

* cited by examiner

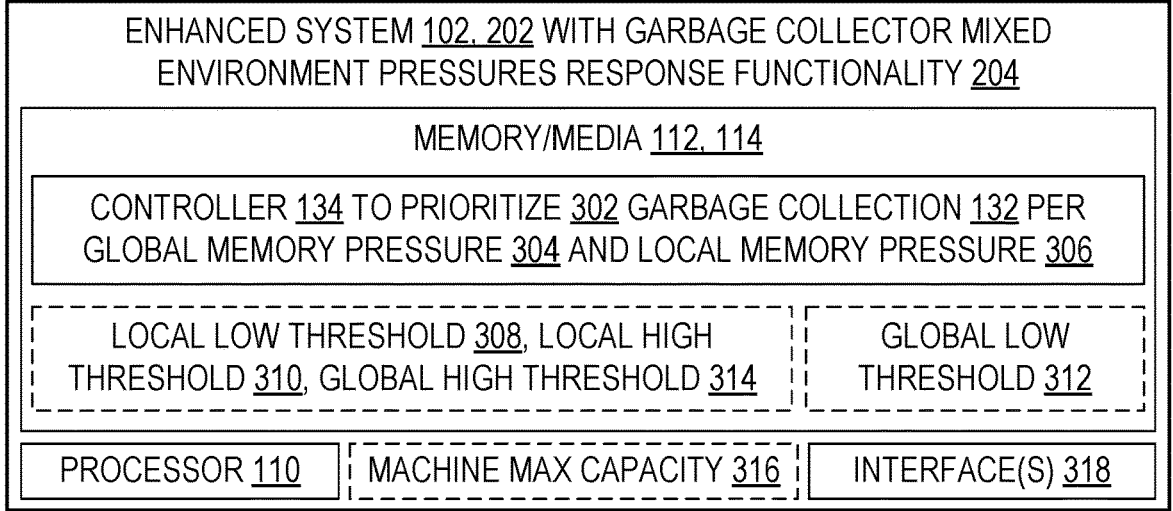

COMPUTING SYSTEM 102, 202 OF MACHINES 101

MEMORY / MEDIA 112 | KERNEL 120 | TOOL 122 | PROCESS 124

GARBAGE COLLECTION 132 CONTROL 134 | HEAP 138

PROCESSOR(S) 110 | DISPLAY(S) 126 | OTHER HARDWARE 128

CONFIGURED MEDIUM 114

INSTRUCTIONS 116

DATA 118

CLOUD 136

⊦ 100 ⊣

USER(S) 104

NETWORK(S) 108

PERIPHERAL(S) 106

Fig. 1

ENHANCED COMPUTING SYSTEM 102, 202 WITH FUNCTIONALITY 204 TO CONTROL 134 GARBAGE COLLECTOR 214 PER MEMORY PRESSURES 206

LOCAL ENVIRONMENT(S) 208

GLOBAL ENVIRONMENT 210 MACHINE 212

Fig. 2

ENHANCED SYSTEM 102, 202 WITH GARBAGE COLLECTOR MIXED ENVIRONMENT PRESSURES RESPONSE FUNCTIONALITY 204

MEMORY/MEDIA 112, 114

CONTROLLER 134 TO PRIORITIZE 302 GARBAGE COLLECTION 132 PER GLOBAL MEMORY PRESSURE 304 AND LOCAL MEMORY PRESSURE 306

LOCAL LOW THRESHOLD 308, LOCAL HIGH THRESHOLD 310, GLOBAL HIGH THRESHOLD 314 | GLOBAL LOW THRESHOLD 312

PROCESSOR 110 | MACHINE MAX CAPACITY 316 | INTERFACE(S) 318

Fig. 3

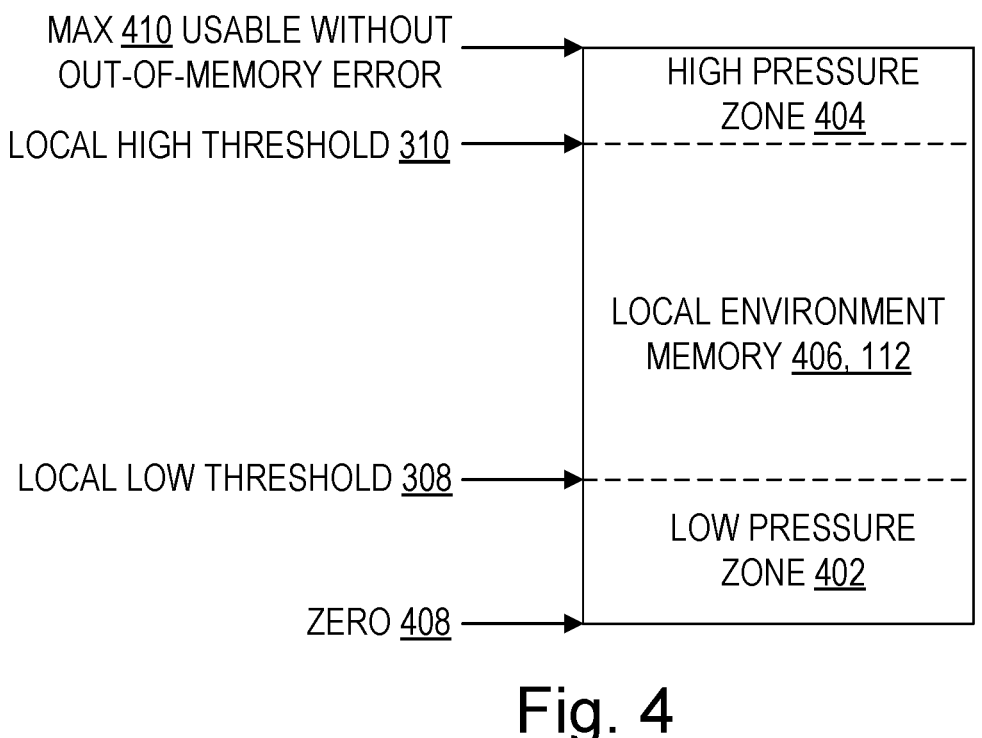

MAX <u>410</u> USABLE WITHOUT OUT-OF-MEMORY ERROR

LOCAL HIGH THRESHOLD <u>310</u>

HIGH PRESSURE ZONE <u>404</u>

LOCAL ENVIRONMENT MEMORY <u>406, 112</u>

LOCAL LOW THRESHOLD <u>308</u>

LOW PRESSURE ZONE <u>402</u>

ZERO <u>408</u>

Fig. 4

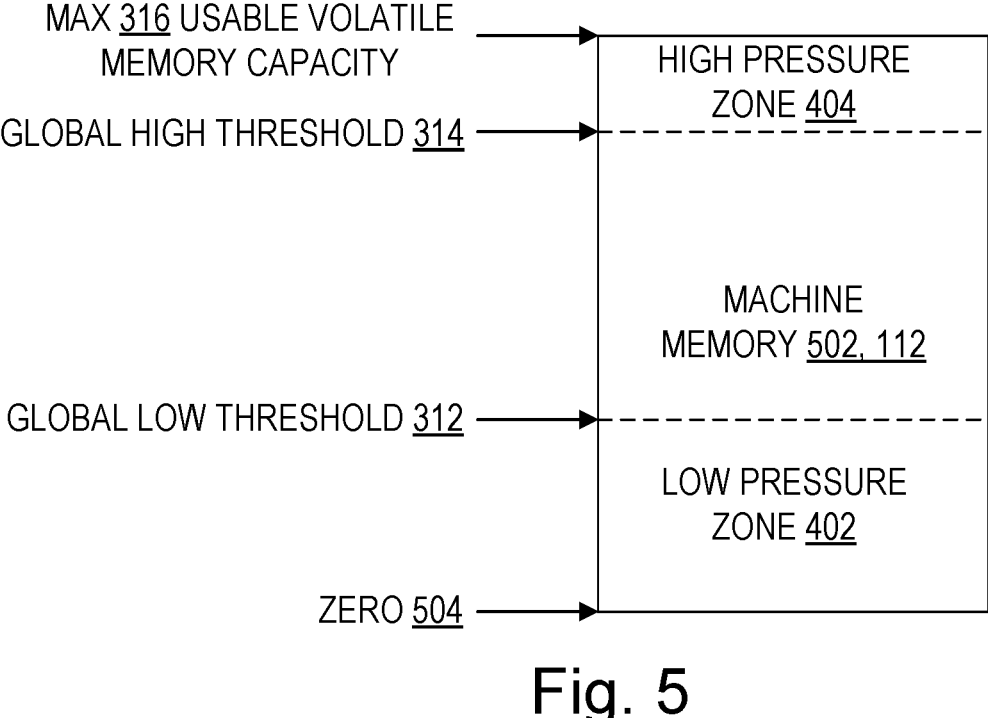

MAX <u>316</u> USABLE VOLATILE MEMORY CAPACITY

GLOBAL HIGH THRESHOLD <u>314</u>

HIGH PRESSURE ZONE <u>404</u>

MACHINE MEMORY <u>502, 112</u>

GLOBAL LOW THRESHOLD <u>312</u>

LOW PRESSURE ZONE <u>402</u>

ZERO <u>504</u>

Fig. 5

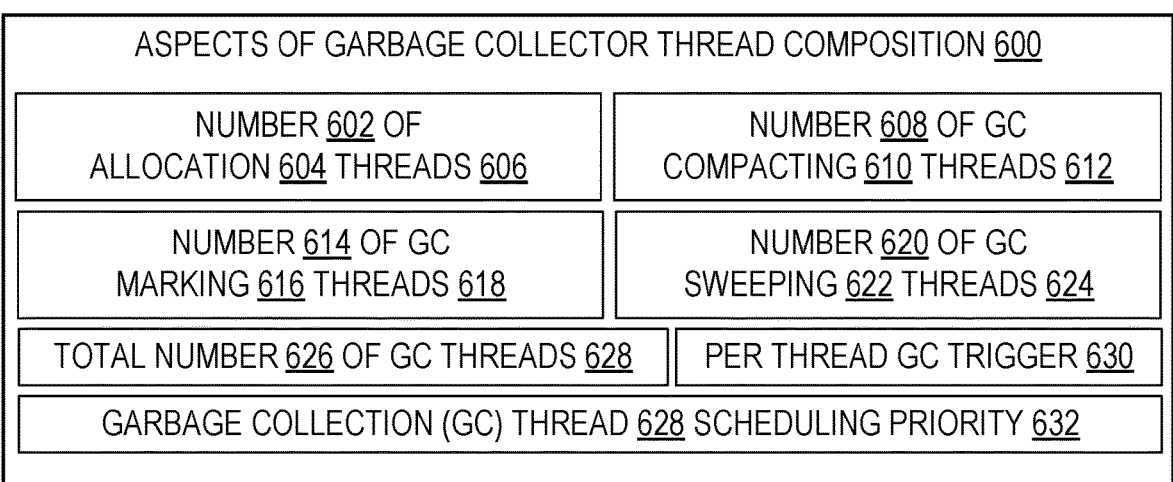

ASPECTS OF GARBAGE COLLECTOR THREAD COMPOSITION 600

| NUMBER 602 OF ALLOCATION 604 THREADS 606 | NUMBER 608 OF GC COMPACTING 610 THREADS 612 |
|---|---|
| NUMBER 614 OF GC MARKING 616 THREADS 618 | NUMBER 620 OF GC SWEEPING 622 THREADS 624 |
| TOTAL NUMBER 626 OF GC THREADS 628 | PER THREAD GC TRIGGER 630 |
| GARBAGE COLLECTION (GC) THREAD 628 SCHEDULING PRIORITY 632 | |

Fig. 6

ASPECTS OF SOME GARBAGE COLLECTED ENVIRONMENTS 208, 210

| LOCAL HIGH THRESHOLDS SUM 702 | | POD 704 OF CONTAINERS 706 |
|---|---|---|
| CGROUP 708 ISOLATION UNIT 710 | | JOB OBJECT 712 ISOLATION UNIT 710 |
| LOCAL ENVIRONMENT (SIGNIFICANT) CONTRIBUTION MEASURE (714) 716 | | |
| GC FREQUENCY 718 | MEMORY USAGE 720 | MEMORY AVAILABILITY 722 |
| OUT-OF-MEMORY (OOM) ERROR 724 | | LOADED MODULE 726 |
| MEMORY USED BY GC FOR GC 728 | | LINEAR CALCULATION 730 |
| GARBAGE COLLECTION PERFORMANCE 732 METRIC 734 VALUE 736 | | |
| VIRTUAL MACHINE 738 | | RESOURCE 740 |
| GC EXECUTION PRIORITY 742: HIGH 744 / LOW 746 / NORMAL 748 | | |

Fig. 7

METHOD 800

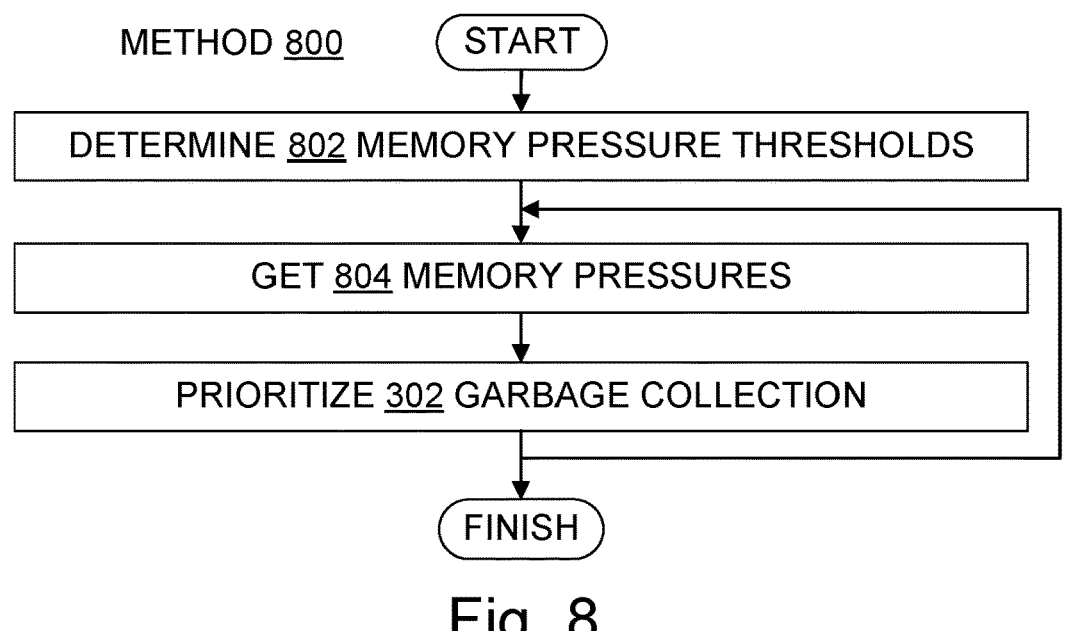

START

DETERMINE 802 MEMORY PRESSURE THRESHOLDS

GET 804 MEMORY PRESSURES

PRIORITIZE 302 GARBAGE COLLECTION

FINISH

Fig. 8

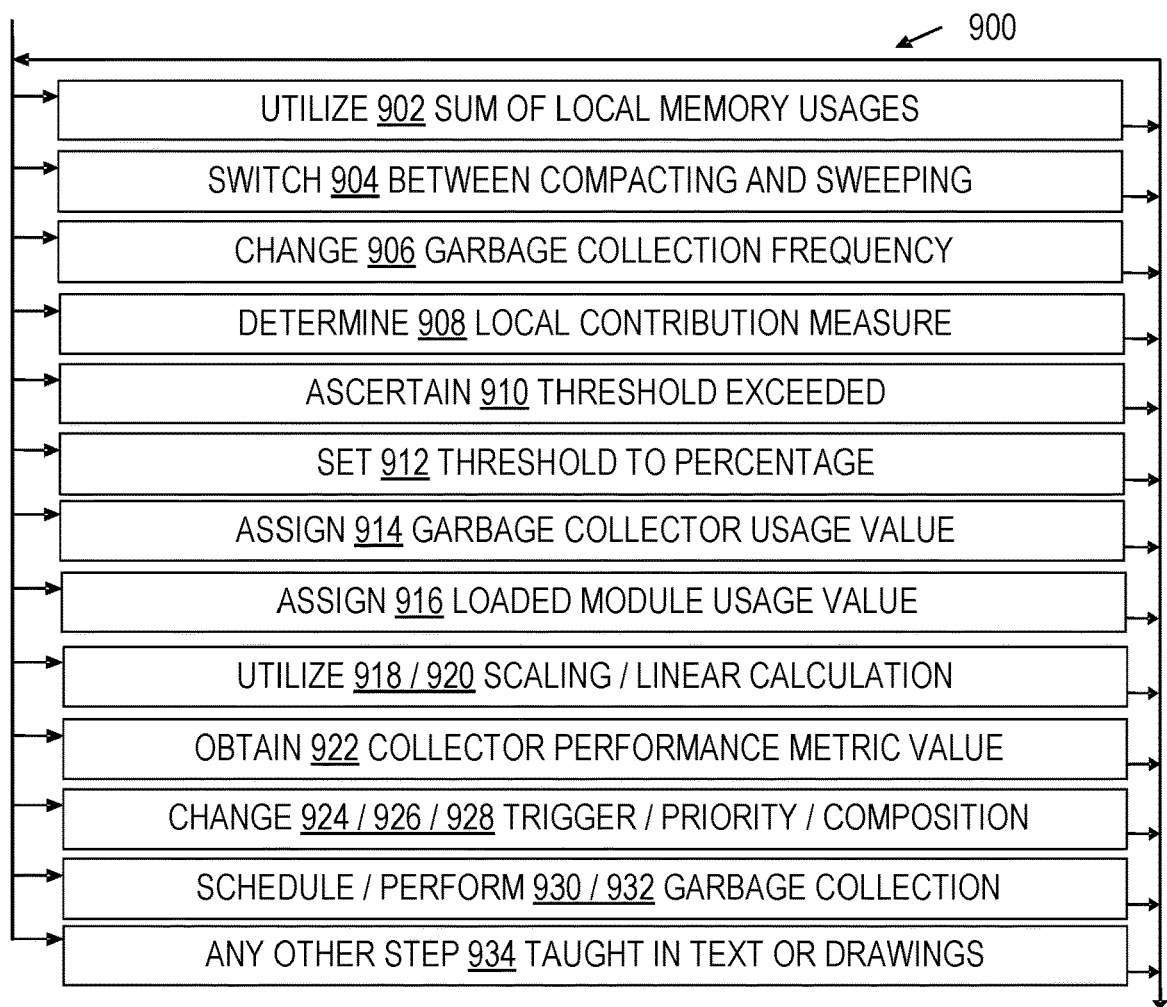

900

UTILIZE 902 SUM OF LOCAL MEMORY USAGES

SWITCH 904 BETWEEN COMPACTING AND SWEEPING

CHANGE 906 GARBAGE COLLECTION FREQUENCY

DETERMINE 908 LOCAL CONTRIBUTION MEASURE

ASCERTAIN 910 THRESHOLD EXCEEDED

SET 912 THRESHOLD TO PERCENTAGE

ASSIGN 914 GARBAGE COLLECTOR USAGE VALUE

ASSIGN 916 LOADED MODULE USAGE VALUE

UTILIZE 918 / 920 SCALING / LINEAR CALCULATION

OBTAIN 922 COLLECTOR PERFORMANCE METRIC VALUE

CHANGE 924 / 926 / 928 TRIGGER / PRIORITY / COMPOSITION

SCHEDULE / PERFORM 930 / 932 GARBAGE COLLECTION

ANY OTHER STEP 934 TAUGHT IN TEXT OR DRAWINGS

Fig. 9

GARBAGE COLLECTION IN CONSTRAINED LOCAL ENVIRONMENTS

BACKGROUND

In computer programming, garbage collection (GC) helps provide automatic memory management. The "garbage" in question is memory space which has been allocated to a program for use, is no longer needed by that program, but is not yet available for use by other programs. The garbage collector tries to identify such areas of memory so they can be reclaimed for subsequent re-allocation.

Garbage collection can free programmers from the need to manually release data objects that are no longer needed, thus making programming easier. Garbage collection can also help prevent some runtime errors, thereby enhancing cybersecurity by improving the integrity and availability of data. Many programming languages either require garbage collection, or else allow garbage collection as an option. Some software development environments allow both garbage collection and manual memory management in a given program.

Efficient implementation of garbage collection can be a high priority because garbage collectors may run frequently or at unpredictable times, or both, and may significantly slow down user program execution. Indeed, most if not all garbage collectors sometimes utilize a "stop the world" approach which prevents user programs from running at the same time as the garbage collector. However, naively reducing the amount of time spent on garbage collection may also reduce the amount of memory reclaimed, and thus hamper user program performance in other ways, e.g., by increasing the time spent swapping data between volatile and nonvolatile memory devices.

Although garbage collection has been used, studied, and modified for several decades, improvements in garbage collection are still possible.

SUMMARY

Some embodiments described herein include a functionality which triggers garbage collection, or include a functionality which tailors garbage collection aggressiveness, or both, based on a local environment memory pressure and also based on a global environment memory pressure. Some embodiments make garbage collection within a local environment a low priority when the local environment memory pressure is below a local high threshold and the global memory pressure is also below a global low threshold. Some embodiments make garbage collection within the local environment a high priority when the local environment memory pressure is above a local high threshold or the global memory pressure is above the global high threshold or both. Some embodiments tailor garbage collection more efficiently in overcommit scenarios than any tailoring by an approach that does not prioritize garbage collection on the basis of a mixture of local and global memory pressures.

Other technical activities and characteristics pertinent to teachings herein will also become apparent. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Advances are defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 1 is a diagram illustrating aspects of computer systems and also illustrating configured storage media, including some aspects generally suitable for systems which provide garbage collector control functionality that is based on both local memory pressure and global memory pressure, that is, the garbage collector responses are based on a mixture of environment memory pressures;

FIG. 2 is a block diagram illustrating an enhanced system configured with a garbage collector mixed environment pressures response functionality;

FIG. 3 is a block diagram illustrating aspects of a system enhanced with a garbage collector mixed environment pressures response functionality;

FIG. 4 is a block diagram illustrating some aspects of a local environment related to memory pressure;

FIG. 5 is a block diagram illustrating some aspects of a global environment (namely, a machine) that are related to memory pressure;

FIG. 6 is a block diagram illustrating some aspects of a garbage collector thread composition;

FIG. 7 is a block diagram illustrating some additional aspects of some garbage collected environments;

FIG. 8 is a flowchart illustrating steps in a garbage collection method; and FIG. 9 is a flowchart further illustrating steps in some garbage collection methods, and incorporating FIG. 8.

DETAILED DESCRIPTION

Overview

Innovations may expand beyond their origins, but understanding an innovation's origins can help one more fully appreciate aspects of an innovation.

In the present case, some teachings described herein were motivated by technical challenges faced by Microsoft innovators who were working to improve technology for garbage collection (GC) in computing systems, and particularly GC in overcommit scenarios.

Garbage collection helps optimize heap size, by removing "garbage" from the heap. The "garbage" is memory space which has been allocated to a process for use, is no longer needed by that process, but is not yet available for use by other processes. Garbage collection identifies such areas of memory and reclaims them so they can safely be allocated again.

When a process 124 runs on a machine 212, a GC can take a memory pressure into consideration as one of the deciding factors for trimming the size of a heap 138. The memory pressure of greatest interest here is volatile memory pressure, such as RAM pressure, as opposed to pressure on nonvolatile memory such as disk memory. The "machine" may be a particular physical device 101, or the "machine" may be a virtual machine 738. The heap is an example of a "managed memory", because it is subject to garbage collection 132. As used herein, "managed memory" also includes memory which is directly or indirectly controlled or influence by the garbage collection, such as memory used by a garbage collector 214 to perform or track garbage collection 132 (sometimes referred to as GC "bookkeeping memory"). Many systems also have memory that is not managed memory, e.g., buffer memory in networking cards, and video display device memory such as a frame buffer. Depending on the embodiment, "memory pressure" means usage of managed memory relative to available managed memory or total managed memory capacity, or "memory pressure" means all usage of memory relative to all available memory, or relative usage of specified memory, e.g., relative usage of memory exclusive of the frame buffer and network card buffers. Memory pressure is presumed to be relative usage of memory that is allocatable on demand by user or kernel processes. Pressure increases as memory usage approaches memory capacity; as that happens, the amount of available unused memory is decreasing. Unless stated otherwise, memory "usage" includes volatile memory usage by one or more processes or process components other than the GC, and also includes volatile memory usage by the GC itself. "Usage" of memory also includes managed memory that was allocated to a user process or kernel, but is no longer needed by that process, and has not yet been made available—via garbage collection—for allocation by another process or re-allocation by the same process. In a given scenario, memory usage may be measured in terms of what how much memory has been allocated and not yet garbage collected, or in terms of how much memory is available to be allocated, or both.

In particular, when a process 124 runs on a machine 212, a GC can take a global memory pressure 304 into consideration as one of the deciding factors for trimming the heap size. The global memory pressure is the usage of volatile machine memory by any process residing on the machine, in comparison to the volatile memory capacity of the machine. When the global memory pressure becomes high according to some measure, GC can start trimming the heap to avoid getting the machine into a paging situation. Trimming makes certain memory available for allocation again, such as memory that was allocated by a process but is no longer needed by the process. Paging involves copying data between volatile memory and nonvolatile memory, which is done to preserve the data when not enough volatile memory is available to hold all the desired data. Paging consumes substantial time and other computational resources 740, and paging is overhead that does not directly move processes forward in their computations, so computing systems are designed to reduce or avoid paging.

In some scenarios, containers 706 are popular mechanisms for constraining computational resource usage generally, and for constraining memory usage in particular. A particular application program, for example, may include one or more containers. A container is a virtualization mechanism which allows software to run in an isolated user space. Tools for container orchestration or container management include, for example, Docker® software (mark of Docker, Inc.) and Kubernetes® software (mark of The Linux Foundation).

In some embodiments discussed herein, a container 706 is an example of a local environment 208, which is also referred to as a "memory constrained environment" or a "memory limited environment". Of course, every computing environment is memory constrained or memory limited in the sense that no computing environment has infinite memory. However, a "local environment" 208 herein is a computing environment which is local to, and resides within, a larger global computing environment 210 on the same machine 212, and which has a local max amount 410 of memory that is less than the maximum volatile memory capacity 316 of the machine.

Various familiar approaches use only a single environmental memory pressure for garbage collection. For example, it has been considered good practice for a process to treat a container as a new isolation unit 710 when the process runs in a container 706, instead of treating the machine 212 as the isolation unit. As a result, memory management in a container is based on the local memory pressure 306 in the container instead of being based on the global memory pressure 304 in the machine 212 where the container resides. In other words, instead of being constrained to the total memory capacity 316 available on a machine 212, GC and memory pressure calculations are based on a memory limit specified for the particular container.

In some scenarios, a developer or other system 102 user overcommits the memory of a machine 212 on which containers 706 are running. Running more containers to implement a given program is sometimes deemed better for program performance than running fewer containers, and sometimes it actually is better. Increasing the number of containers tends to increase the likelihood of overcommitting memory. For instance, if each container is constrained to C megabytes of the machine's volatile memory, and if the machine has a total of T megabytes of volatile memory, then the memory is overcommitted if there are more than T/C containers. Memory of a virtual machine with a capacity 316 of 100 mb is fully committed at fifty 2 mb containers in a process 124 running on the virtual machine, and is overcommitted with any more than fifty 2 mb containers.

However, process performance may be acceptable even though the memory is overcommitted, because performance depends on the amount of memory actually used, not on the amount of memory potentially used or the amount of memory containers have requested for use. In some cases, the process runs at first without overcommitting the machine memory, and the process does not add a container that overcommits memory (e.g., the fifty-first 2 mb container) until the process performance is assessed to be acceptable. Alternately, in some cases the memory overcommitment is allowed to happen sooner, on the basis that any container which exceeds its respective memory limit will be killed to prevent runaway memory usage in that individual container. Killing such containers will reduce machine memory usage, but will not necessarily prevent or undo overcommitment.

In some orchestrated environments, each container is subject to two memory constraints. In terminology that is used with Kubernetes® software and with some other container software, these memory constraints are referred to as a "limit" of the container and a "request" of the container; they are examples of values referred to herein as the "k-limit" and the "k-request". The k-request is an amount of heap memory 138 requested by the container, and is sometimes used for scheduling. The k-request generally specifies an amount of memory at which performance of the process running in the container is (or is expected to be) still acceptable, but not necessarily the best possible. The k-limit is equal to or higher than the k-request, and specifies a hard upper limit; the container will be killed due to an out-of-memory (OOM) error if the k-limit is exceeded.

In some cases, an API is called to get each container's k-limit to investigate whether it is possible, or potentially beneficial, or both, to schedule more containers onto a given machine 212. Similarly, pods 704 or nodes 212 may be polled as to memory usage. A container orchestration tool or container management tool, for example, sometimes provides such an API. Tools such as kubectl or k9s may also or instead be utilized to get each container's usage. However, this polling approach to overcommit decision-making is computationally expensive due to the repeated API or other GC-external tool calls with container or pod enumeration, and is also often more fine-grained than necessary. Many calls may also be made that in hindsight were largely wasteful because usage was distant from the overcommit threshold. More efficient yet still effective approaches are taught herein.

Some embodiments described herein use a combination of the global memory pressure 304 and an isolation unit's own local memory pressure 306 to optimize memory usage in containers 706 and other isolation units 710. Based on a combination of the global and local memory pressures, a GC determines when to be generous with the heap memory usage, and when to be frugal with heap memory usage. In some embodiments, a GC is generous with the heap memory usage when the global memory pressure is low, because there is plenty of memory not getting used; however, isolation units are still not permitted to exceed their respective caps on memory usage. In some embodiments, the GC is frugal when the global memory pressure becomes high, as long as performance is still acceptable, so that the GC is better able to meet the overcommit demand.

In some embodiments, when the GC is generous, the GC heap can be allocated up to the container max 410. In some embodiments, when the GC is frugal, the GC heap can be allocated only up to a container k-request value, or in a variation only up to a container low threshold 308.

The k-request generally specifies an amount of memory at which performance of the process running in the container is (or is expected to be) still acceptable, but not necessarily the best possible. The k-limit is equal to or higher than the k-request, Some embodiments utilize the k-limit and the k-request, or other memory usage thresholds, when optimizing GC to manage memory pressures. For instance, when the global memory pressure is low, one GC uses the k-limit value to optimize heap memory usage, but when global memory pressure is high, the GC uses the k-request value instead. In some embodiments, the GC uses by default a fraction of the k-request or k-limit values to tune the GC heap. This allows for memory usage that is not contributed by the GC heap 138, such as usage by executable modules loaded into memory and usage by the GC itself.

GCs taught herein accommodate overcommit scenarios and other scenarios better by taking a combination of both memory pressures into account, instead of relying solely on global pressure or relying solely on local pressure.

For example, assume a conventional garbage collector determination of whether to trim the heap is based solely on a container's local pressure, and there is only a low or medium local pressure in the container. As a result, the conventional garbage collector does not trim the heap. When the global pressure is high but is not monitored by this conventional local GC, the lack of heap trimming by the local GC is a missed opportunity to reduce the global pressure. Missed opportunities decrease efficiency. In particular, the high global pressure makes it more likely in an overcommitted scenario that another container will attempt to exceed its k-limit and then die due to an OOM error, which is an inefficient use of computational resources 740.

As another example, assume that the local pressure is high but the global pressure is low. A GC determination whether to trim or not that is based solely on the global pressure will not trim, despite the high local pressure in the container. This increases the risk that the container will attempt to exceed its k-limit and then die due to an OOM error. It also hinders overcommitment by not using available memory efficiently. Containers are more likely to die from OOM errors even when they could have been trimmed and kept alive as part of a larger number of containers on the machine 212. The low global pressure indicates more containers could be running, but if they subsequently die from avoidable OOM errors, then the full performance gain sought by attempted or actual overcommitment will not be achieved.

As another example, assume again that the conventional garbage collector determination of whether to trim the heap is based solely on a global pressure. Assume further that the global pressure is high but there is only low local pressure in the container. Then the conventional garbage collector expends resources 740 trimming the heap even though there is little benefit to doing so, because of the low local usage.

After considering various approaches for GC, and their implications for processes, performance, and overcommitment scenarios, an approach was conceived which includes various beneficial teachings provided herein. These teachings address technical challenges such as determining which kinds of data to use as GC triggers, determining what priority to give GC in which circumstances, and determining how to take k-limit and k-request into account in managing GC.

Some embodiments described herein utilize or provide an enhanced system which is configured to make garbage collection within a local environment a low priority when local environment memory usage is below a local high threshold and global memory usage is below a global low threshold. This garbage collection functionality has the technical benefit of avoiding garbage collection which is based solely on a local memory pressure. Garbage collection which is based solely on a container's local pressure misses opportunities to reduce global pressure, thereby decreasing efficiency and making it more likely in an overcommitted scenario that a container will die due to an out-of-memory error.

Some embodiments described herein utilize or provide an enhanced system which is configured to make garbage collection within a local environment a high priority when local environment memory usage is above a local high threshold or global memory usage is above a global high threshold or both. This garbage collection functionality has the technical benefit of avoiding garbage collection which is based solely on a global memory pressure. Garbage collection which is based solely on a global memory pressure expends resources trimming a heap even though there is little benefit to doing so because of a low local usage.

Some embodiments described herein utilize or provide a garbage collection method which includes assigning a garbage collector usage value which represents memory usage by a garbage collector, and setting a local low threshold based in part on the garbage collector usage value. This has the technical benefit of taking usage by the GC itself into account when prioritizing the GC, thereby making the GC prioritization more accurate and avoiding OOM errors due to undercounting usage by assuming that heap usage is the only memory usage.

Some embodiments described herein utilize or provide a garbage collection method which includes assigning a loaded module usage value which represents memory usage by a loaded module, and setting the local low threshold based in part on the loaded module usage value. This has the technical benefit of taking usage by loaded code modules into account when prioritizing the GC, thereby making the GC prioritization more accurate and avoiding OOM errors due to undercounting usage by assuming that heap usage is the only memory usage.

Some embodiments described herein utilize or provide a garbage collection method which includes prioritizing garbage collection within a local environment based on a local low threshold, a local high threshold, a global high threshold, a local environment memory pressure representing memory usage in the local environment, and a global memory pressure representing memory usage in the machine. This garbage collection functionality has the technical benefit of avoiding garbage collection which is based solely on a local memory pressure, and avoiding garbage collection which is based solely on a global memory pressure. Basing garbage collection on a mixture of local and global pressures improves system performance in overcommitted memory scenarios.

These and other benefits will be apparent from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 318 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. The same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, multi-environments memory pressures garbage collection functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

The foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More about Systems

FIG. 2 illustrates a computing system 102 configured by one or more of the garbage collector prioritization enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

FIG. 3 shows some aspects of some enhanced systems 202. This is not a comprehensive summary of all aspects of enhanced systems 202 or all aspects of mixed environment pressures GC response functionality 204. Nor is it a comprehensive summary of all aspects of an environment 100 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIGS. 4 and 5 illustrate aspects of memory pressures 206 in a local environment (FIG. 4) and in a global environment (FIG. 5). The high memory pressure thresholds 310 and 314 define levels of memory pressure 206 as high pressure 404, and the low memory pressure thresholds 308 and 312 define levels of memory pressure 206 as low pressure 402. FIG. 4 items and FIG. 5 items are also discussed at various points herein, and additional details regarding them are provided in the discussion of a List of Reference Numerals later in this disclosure document.

In particular, the max 410 amount of usable volatile memory of a local environment 208 which is shown in FIG. 4 corresponds in some embodiments to a k-limit, e.g., a Kubernetes® limit value (mark of The Linux Foundation). In other embodiments, the max 410 and the k-limit are not equal. For example, in some embodiments the max 410 is determined based in part on a garbage collector usage value 728 or a loaded module value 726 that is not reflected in the k-limit. The max 410 is presumed to be smaller than memory usage limits that are dictated by hardware 112. The max usable amount 316 for the machine 212, however, is dictated by hardware 112, e.g., by how much RAM is on board.

Also, in some units the local low threshold 308 is set to a k-request, e.g., a Kubernetes® request value. However, other values are used for the local low threshold 308 in some embodiments, e.g., a specified percentage of the max 410 which does not necessarily match the k-request. More generally, some embodiments determine local thresholds 308, 310 or the local max 410 based on a k-limit or a k-request or both, either by virtue of the determined value 308, 310, or 410 being the same as a k-limit or a k-request or being a percentage of the k-limit or k-request, or both. But some embodiments do not involve the k-limit or k-request as input to the functionality 204. Embodiments are not limited to scenarios that involve a Kubernetes® request or a Kubernetes® limit or both.

FIG. 6 shows some aspects of garbage collector thread composition 600. The terms "garbage collector thread composition" and "garbage collection thread composition" are used interchangeably herein. FIG. 6 is not a comprehensive summary of all aspects or examples of garbage collector thread composition, or a requirement that every example aspect shown be used in a given embodiment. FIG. 6 items are discussed at various points herein, and additional details regarding them are provided in the discussion of a List of Reference Numerals later in this disclosure document.

FIG. 7 shows some additional aspects of some garbage collected environments. FIG. 7 items are discussed at various points herein, and additional details regarding them are provided in the discussion of a List of Reference Numerals later in this disclosure document.

Other figures are also relevant to systems 202. FIGS. 8 and 9 illustrate methods of system 202 operation.

In some embodiments, the enhanced system 202 is networked through an interface 318. In some, an interface 318 includes hardware such as network interface cards, software such as network stacks, APIs, or sockets, combination items such as network connections, or a combination thereof.

Some embodiments include a computing system 202 with at least two local environments 208 such as containers, and a GC control 134 which prioritizes 302 local environment garbage collection based on local and global memory usage 206 and thresholds 308, 310, 314. The GC control 134 is also referred to as a GC controller 134. Some embodiments include only a single local environment 208 which has local thresholds 308 and 310. For example, some embodiments operate in a global environment 210 having a single container 706 on a machine 212. Other processes 124 run on the same machine 212 but they are not running in a container 706. Some embodiments operate in an environment having multiple containers 706 but having only one container 706 subject to memory limit thresholds 308 and 310. Different constraints such as CPU limits are specified, or not, on such memory limited container(s) 706, 208 or on other containers 706 or both, depending on the embodiment and the scenarios.

The GC 214 itself is not necessarily part of a particular embodiment. However, that does not prevent the GC control 134 from being integrated into the GC 214, e.g., as code that is compiled as part of the GC.

In some embodiments, making 302 garbage collection a high priority either executes a garbage collection or increases the likelihood of a garbage collection execution. An increase in likelihood is accomplished by one or more actions such as lowering 924 a trigger threshold 630 at which GC is triggered to run (i.e., execute), increasing 926 a scheduling priority 632 of a GC thread, or requesting or making 928 a change in GC thread composition 600 characteristics such as the number of GC threads or the kinds of GC threads (allocating, marking, sweeping, compacting) that are present.

In some embodiments, when global pressure 304 is low and local pressure 306 is not high, GC execution is made 302 a low priority 746. When global pressure 304 is high or local pressure 306 is high, GC execution is made 302 a high priority 744. Otherwise, the execution priority 742 is normal 748.

Some embodiments include a computing system 202 which is configured to perform memory garbage collection based on different memory pressures 206. The computing system 202 includes: a digital memory 112; a processor set 110 including at least one processor 110, the processor set in operable communication with the digital memory; a local low threshold 308, the local low threshold being a nonzero low memory pressure threshold of a local environment 208, the local environment residing in a machine 212 of the computing system, the machine containing a second local environment; a local high threshold 310, the local high threshold being a high memory pressure threshold of the local environment, the local high threshold greater than the local low threshold; a global low threshold 312, the global low threshold being a nonzero low memory pressure threshold of the machine; a global high threshold 314, the global high threshold being a high memory pressure threshold, the global high threshold greater than the global low threshold; and a garbage collector control 134. The local low threshold, the local high threshold, the global low threshold, the global high threshold, and the garbage collector control reside in and configure the memory. In a variation, the machine does not contain a second local environment.

In some embodiments, GC proceeds as it would in the absence of low thresholds and high thresholds (but not the absence of limits 410, 316) when the pressures 304 and 306 are in between their respective low and high thresholds. In this scenario, the GC execution priority 742 is normal 748.

Upon execution by the processor, the garbage collector control 134 in some embodiments prioritizes 302 garbage collection within the local environment as follows: making 302 garbage collection within the local environment a low priority 746 when local environment memory usage is below the local high threshold and global memory usage is below the global low threshold, and making 302 garbage collection within the local environment a high priority 744 when local environment memory usage is above the local high threshold or global memory usage is above the global high threshold or both. GC priority refers to the priority of executing a garbage collection, i.e., the priority of actual execution of the garbage collector to perform garbage collection, or the relative likelihood of such execution.

In some embodiments, making 302 garbage collection within the local environment a low priority 746 includes using the max 410 to compute local memory pressure 306. In some embodiments, making 302 garbage collection within the local environment a high priority includes using the local low threshold 308 to compute local memory pressure 306. In some embodiments, making 302 garbage collection within the local environment a high priority includes using the local high threshold 310 to compute local memory pressure 306.

In some scenarios, volatile memory 112 is overcommitted. In some overcommitted memory example scenarios, if every container (local environment) tried concurrently to use its limit (local high threshold) amount of memory, there would not be enough RAM (usages would exceed a maximum volatile memory capacity 316 of the machine 212), but less memory than that is actually being used. In one set of scenarios the containers (local environments) are not using enough memory to make the global pressure high (the sum of memory usages of the multiple local environments does not exceed the global high threshold 314). In a second set of scenarios, the containers are using enough memory to make the global pressure high but not enough to exceed to machine's capacity 316.

In some embodiments, multiple local environments 208 are running on the machine 212, a sum of local high thresholds 310 of the multiple local environments exceeds a maximum volatile memory capacity 316 of the machine, and a sum of memory usages 306 of the multiple local environments satisfies one of the following conditions: the sum does not exceed the global high threshold 314; or the sum exceeds the global high threshold but the sum does not exceed the maximum volatile memory capacity 316 of the machine.

Containers 706 are one example of local environments 208. Local environments 208 also referred to as isolation units 710 with the understanding that the isolation in question includes memory space isolation. In some embodiments, a local environment may also or instead be specified as a container pod 704, a cgroup 708, or a job object 712, for example. In some embodiments, the local environment 208 includes one of the following: a container 706; a pod 704 of containers 706; a memory isolation unit 710 specified by a cgroup 708; or a memory isolation unit 710 specified by a job object 712.

In some scenarios, global pressure is high and a local environment is garbage collected because it is using a significant 714 amount of memory relative to the machine overall, e.g., relative to the available global memory. A local environment contribution measure 716 represents the size of a current memory usage in a process 124 relative to available global memory, and contribution significance 714 is a specified threshold contribution measure 716. For instance, contribution significance 714 is a specified percentage of global max 410 or a specified percentage of global pressure 304, depending on the embodiment. Checking a local environment contribution measure 716 to determine if it is a significant contribution 714 improves efficiency by delaying or preventing low-reward GC computational costs, especially when the global pressure 304 is high.

For instance, assume global pressure is high but the contribution 716 of a process P1 in a local environment LE1 is relatively small (i.e., not significant 714). In this example scenario, aggressive GC on P1 would not contribute much to relieve the global pressure, so the GC priority 742 on P1 is set 302 to a low priority 746. On the other hand, in this example a process P2 contribution 716 in a local environment LE2 is significant 714, so the GC priority 742 on P2 is set 302 to a high priority 744. Collecting garbage on P2 is more effective at reducing global pressure than GC on P1. The GC priorities for the local environments are set accordingly, to reduce P2 memory pressure in local environment LE2 before reducing P1 memory pressure in local environment LE1.

In some embodiments, the computing system 202 is further characterized by the following: a local environment contribution measure 716 resides in and configures the memory, the local environment contribution measure representing an amount of memory usage by the local environment or an amount of local environment memory availability relative to an amount of global memory usage or an amount of global memory availability; and the garbage collector control 134 prioritizes 302 garbage collection in part by making garbage collection within the local environment a high priority 744 when global memory usage 304 is above the global high threshold 314 and the local environment contribution measure 716 exceeds a significant contribution threshold 714.

In some embodiments and some scenarios, the prioritization 302 is performed proactively by the controller 134. In some, the prioritization 302 is performed at least partially in response to input from a control 134 interface 318 which is invoked, e.g., by a user process 124. For example, in some scenarios a GC control 134 interface 318 allows a user to specify how many processor cores the GC can use, or directly sets one or more of the thresholds 308, 310, 312, 314. In some scenarios, the GC control 134 interface 318 allows the controller 134 to accept information that is external to the process 124 and external to the GC 214, and based at least in part on that external info the controller 134 can then influence or override the GC thread composition 600 or the GC execution priority 742.

Although heap memory is managed memory, the term "managed memory" is also used herein, because "heap" can mean two different things in embodiments in which individual threads are responsible for only a portion of a larger area of managed memory. From the GC perspective, the managed memory in such an implementation is made of multiple per-thread heaps, whereas from the process 124 perspective it's all one heap. Sometimes work stealing between such GC threads is permitted, but a given thread remains primarily responsible for managing its own respective heap on behalf of the process 124. In some other embodiments, by contrast, a GC thread is not primarily or solely responsible for only a portion of the heap; instead, every GC thread can routinely manage any portion of the heap. Under either approach—whether the heap is divided between threads, or not—the managed memory includes at least one heap.

Other system embodiments are also described herein, either directly or derivable as system versions of described processes or configured media, duly informed by the extensive discussion herein of computing hardware.

Although specific garbage collector control architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of garbage collector control functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 8 and 9 each illustrate a family of methods 800 and 900 respectively, which are performed or assisted by some enhanced systems, such as some systems 202 or another garbage collector prioritization functionality enhanced system as taught herein. Method family 800 is a proper subset of method family 900.

FIGS. 1 to 7 illustrate mixed environments pressures GC system 202 architectures with implicit or explicit actions, e.g., launching a process 124, launching a garbage collector, calculating a local memory pressure 306, calculating a global memory pressure 304, and performing garbage collection operations such as marking, sweeping, compacting, allocating, updating GC data structures, creating or suspending or reviving or terminating GC threads, or otherwise processing data 118, in which the data 118 includes, e.g., heap memory 112, 138, GC data structures, memory pressures 206, isolation unit 710 descriptions, machine 212 descriptions, GC execution priorities 742, GC thread scheduling priorities 632, and GC performance metric values 736, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types data in response to process 124 execution or kernel 120 execution. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 9. FIG. 9 is a supplement to the textual examples of embodiments provided herein and the textual descriptions of embodiments provided herein. In the event of any alleged inconsistency, lack of clarity, or excessive breadth due to an aspect or interpretation of FIG. 9, the text of this disclosure shall prevail over that aspect or interpretation of FIG. 9.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a given sequence S of steps which is consistent with FIG. 9 is non-operable, the sequence S is not within the scope of any claim. Any assertion otherwise is contrary to the present disclosure.

Some embodiments provide or utilize a method 900 performed by a computing system 202 having a managed memory to perform memory garbage collection based on different memory pressures. In this discussion and generally elsewhere herein, "method" is used in the legal sense and "process" is used in the computer science sense. The method includes determining 802 a local low threshold 308, the local low threshold being a nonzero low memory pressure threshold of a local environment 208, the local environment residing in a machine 212 of a computing system 102; determining 802 a local high threshold 310, the local high threshold being a high memory pressure threshold of the local environment, the local high threshold not less than the local low threshold; determining 802 a global low threshold 312, the global low threshold being a nonzero low memory pressure threshold of the machine; determining 802 a global high threshold 314, the global high threshold being a high memory pressure threshold, the global high threshold greater than the global low threshold; and prioritizing 302 garbage collection within the local environment based on the local low threshold, the local high threshold, the global low threshold, the global high threshold, a local environment memory pressure representing memory usage in the local environment, and a global memory pressure representing memory usage in the machine.

Some embodiments change GC aggressiveness, e.g., by changing the kind of GC performed or the frequency of GC performed, or the scope of a GC performed. For example, a compacting GC is more aggressive than a sweeping GC. In some embodiments, the prioritizing 302 includes switching 904 between a compacting 610 garbage collection and a sweeping 622 garbage collection. As another example, more frequent GC is more aggressive than less frequent GC. In some embodiments, the prioritizing 302 includes changing 906 a garbage collection frequency 718. As another example, a GC which collects a larger part of a heap is more aggressive than a GC that collects a smaller part. Assume there are 1000 regions on a GC heap and assume the GC can choose to collect X % of them, with X being subject to change. Choosing an X value X1 will make the GC more aggressive than choosing an X value X2, where X2 is less than X1.

In some scenarios, global pressure is high but a local environment is not high priority for garbage collection because it is not using a significant amount of memory relative to the machine overall. In some embodiments, the method includes determining 908 a local environment contribution measure 716, the local environment contribution measure representing an amount of memory usage by the local environment or an amount of local environment memory availability relative to an amount of global memory usage or an amount of global memory availability; and the prioritizing 302 includes ascertaining 910 that the global memory pressure exceeds the global high threshold, ascertaining 910 that the local environment contribution measure is below a significant contribution threshold 714, and in response making 302 garbage collection within the local environment a low priority 746.

The thresholds 308, 310, 312, 314 are set 802 in various ways, depending on the embodiment. In some cases, a global threshold 312 or 314 or both is set at a respective percentage of RAM capacity 316 for the machine, and a local threshold 308 or 310 or both is set at a percentage of a max allowed amount 410 of memory before OOM.

In some embodiments, the method is further characterized by at least one of the following: determining 802 the local low threshold 308 includes setting 912 the local low threshold to a percentage of a maximum amount 410 of memory usable in the local environment without incurring an out-of-memory error (e.g., 50% or 75% of k-limit); determining 802 the local high threshold 310 includes setting the local high threshold to a percentage of a maximum amount 410 of memory usable in the local environment without incurring an out-of-memory error (e.g., 90% or higher of k-limit); determining 802 the global low threshold 312 includes setting 912 the global low threshold to a percentage of a maximum amount 316 of volatile memory capacity of the machine; or determining 802 the global high threshold 314 includes setting 912 the global high threshold to a percentage of a maximum amount 316 of volatile memory capacity of the machine.

In some embodiments, threshold determination 802 factors in an approximation of memory usage 728 by the GC itself, or native usage such as use 726 by a loaded library, or both. Memory usage by a garbage collector refers to memory used by a GC to do its bookkeeping, for instance, as opposed to a memory area managed by a GC for use by a process 124 other than the garbage collector.

In some embodiments, the method is further characterized by at least one of the following: determining 802 the local low threshold includes assigning 914 a garbage collector usage value 728 which represents memory usage by a garbage collector, and setting 802 the local low threshold based in part on the garbage collector usage value; determining 802 the local low threshold includes assigning 916 a loaded module usage value 726 which represents memory usage by a loaded module, and setting 802 the local low threshold based in part on the loaded module usage value; determining 802 the local high threshold includes assigning 914 a garbage collector usage value 728 which represents memory usage by a garbage collector, and setting 802 the local high threshold based in part on the garbage collector usage value; or determining 802 the local high threshold includes assigning 916 a loaded module usage value 726 which represents memory usage by a loaded module, and setting 802 the local high threshold based in part on the loaded module usage value.

Some embodiments linearly scale the local memory pressure or a local memory threshold when the global memory pressure is between the global low threshold and the global high threshold. For example, in one scenario the local low threshold is 500 mb and the local OOM limit is 800 mb. When global memory pressure is in between 75% and 90% global memory pressure, the local high threshold is determined by a scaling calculation. When the global memory pressure is 85%, the calculation is $(800-500)*(85-75)/(90-75)+500=700$.

In some embodiments, the method includes determining 802 the local high threshold according to a linear calculation 920 based on at least the local low threshold (e.g., 500 mb), the maximum amount of memory usable in the local environment without incurring an out-of-memory error (e.g., 800 mb), the global low threshold (e.g., 75%), the global high threshold (e.g., 90%), and the global memory pressure (e.g., 85%). The example in the previous paragraph above uses the numbers shown in parentheses in this paragraph, but the linear calculation 920 may vary between embodiments, e.g., by the introduction of coefficients or offsets (a.k.a. constants). Embodiments are not limited in scope to the particular numbers in the example or the particular linear calculation formula in the example.

In some embodiments, the method includes scaling 918 a local memory pressure 306 based on at least the global memory pressure 304. The example linear calculation above is also an example of scaling 918 a local memory pressure 306 based on at least the global memory pressure 304. In a different example, local memory pressure is scaled by a factor such as (1+(global memory pressure/max capacity). Thus, as global memory pressure 304 approaches max capacity 316, local memory pressure 306 is multiplied by a factor that approaches 2, which makes local GC increasingly aggressive as global memory pressure rises.

In some embodiments, at least one threshold determining step 802 includes: obtaining 922 a garbage collector performance metric value 736, and setting 802 at least one of the thresholds 308, 310, 312, 314 based at least in part on the garbage collector performance metric value. For example, in some scenarios, when a GC pause time 736 is relatively low a local high threshold is decreased to make GC more aggressive, even though the pause time is likely to increase as a result.

In some embodiments, the method includes comprising at least one of: performing 932 a garbage collection within the local environment in response to a result of the prioritizing; or scheduling 930 a garbage collection within the local environment in response to a result of the prioritizing.

In some embodiments, prioritizing 302 garbage collection within the local environment includes at least one of: lowering 924 a garbage collection trigger threshold 630; increasing 926 a scheduling priority 632 of a garbage collection thread; or adjusting 928 a garbage collection thread composition 600.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as a garbage collector 214, a garbage collection thread composition 600, thresholds 308, 310, 312, 314, priorities 632, 742, cgroups 708, job objects 712, containers 706, pods 704, and a controller 134, in the form of data 118 and instructions 116, read from a removable storage medium 114 and/or another source such as a network connection, to form a configured storage medium. The configured storage medium 112 is capable of causing a computer system 202 to perform technical process steps for providing or utilizing garbage collection mixed environment (i.e., local and global) pressures response (e.g., prioritization) functionality 204, as disclosed herein. The Figures thus help illustrate configured storage media embodiments and process (a.k.a. method) embodiments, as well as system and process embodiments. In particular, any of the method steps illustrated in FIG. 8 or 9, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 900 to perform memory garbage collection 132 based on different memory pressures 206. This method includes: determining 802 a local low threshold 308, the local low threshold being a nonzero low memory pressure threshold of a local environment, the local environment residing in a machine of a computing system; determining 802 a local high threshold 310, the local high threshold being a high memory pressure threshold of the local environment, the local high threshold not less than the local low threshold; determining 802 a global high threshold 314, the global high threshold being a high memory pressure threshold, the global high threshold not less than the global low threshold; and prioritizing 302 garbage collection within the local environment based on the local low threshold, the local high threshold, the global high threshold, a local environment memory pressure representing memory usage in the local environment, and a global memory pressure representing memory usage in the machine.

In some embodiments, the method includes determining 802 at least one of the local thresholds 308 or 310 or both based on at least the global memory pressure 304.

In some embodiments, the method includes determining 802 at least one of the local thresholds 308 or 310 or both based on at least a garbage collector usage value 728 which represents memory usage by a garbage collector as opposed to usage of garbage collected memory by a process other than the garbage collector.

In some embodiments, the method includes determining 802 a respective local low threshold 308 and a respective local high threshold 310 for each of at least three local environments 208, each local environment residing in the machine 212, and prioritizing 302 garbage collection within each of the local environments, a sum of the local high thresholds exceeding the global high threshold. "Respective" allows but does not require different values in different local environments for a given kind of threshold.

In some embodiments, the method is further characterized by at least one of the following: determining 802 the local low threshold includes setting 912 the local low threshold to a value which is in a range from fifty percent to eighty percent of a maximum amount of memory usable in the local environment without incurring an out-of-memory error; or determining 802 the local high threshold includes setting 912 the local high threshold to a value which is in a range from seventy percent to ninety-five percent of a maximum amount of memory usable in the local environment without incurring an out-of-memory error.

Additional Observations

Additional support for the discussion of garbage collector thread prioritization functionality 204 herein is provided under various headings. However, it is all intended to be understood as an integrated and integral part of the present disclosure's discussion of the contemplated embodiments.

One of skill in the art will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present advances, has no role in interpreting the claims presented in this patent disclosure. With this understanding, which pertains to all parts of the present disclosure, examples and observations are offered herein.

Some embodiments improve garbage collector performance in containers 706 by using a combination of global memory pressure 304 and local memory pressure 306 to maximize memory usage in containers.

A heap 112, 138 that is managed by a GC is sometimes referred to as a "GC heap". This is not to be confused with a separate memory region 728 that is (in some GC implementations) also organized as a heap but is used by the GC itself, a.k.a. the "GC's heap" or the "GC's own heap" 728.

In some embodiments, the system 202 is an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as computing system memory garbage collection 132, computing system thread 628 scheduling, and isolation 710 of memory spaces in a computing system using mechanisms such as containers 706, container pods 704, cgroups 708, and job objects 712, which are each an activity deeply rooted in computing technology. Some of the technical mechanisms discussed include, e.g., garbage collectors 214, threads 628, containers 706, container pods 704, cgroups 708, job objects 712, and garbage collection controllers 134. Some of the technical effects discussed include, e.g., garbage collection effectiveness and efficiency which is based on checking both a global memory pressure and a local memory pressure, optimization of memory usage in memory overcommitment scenarios, and increased accuracy of memory usage estimates. Thus, purely mental processes and activities limited to pen-and-paper are clearly excluded. Other advantages based on the technical characteristics of the teachings will also be apparent from the description provided.

One of skill in the art understands that garbage collection 132 is a technical activity which cannot be performed mentally because it requires traversal and modification of computing system memory 112. This includes, for example, traversal of heap management data structures such as a free list, and garbage collection operations such as marking 616, sweeping 622, and compacting 610. Merely thinking about operations to manipulate a memory 112 will not accomplish those operations. Thoughts alone, or pen-and-paper manipulations, will not accomplish computer memory garbage collection 132. As disclosed herein, garbage collection also involves creation, scheduling, suspension, execution, and termination of garbage collection threads 628 in a computing system, which cannot be performed mentally or manually.

Moreover, mental or pen-and-paper activity cannot pause computing system execution of a process 124 as needed to permit the execution of garbage collection operations such as (depending on the GC implementation) marking 616, sweeping 622, or compacting 610.

One of skill in the art also understands that attempting to perform garbage collection 132 even in part manually or mentally would create unacceptable delays in program execution, and would introduce a risk of human errors that can cause programs 124 to crash. People manifestly lack the speed, accuracy, memory capacity, and specific processing capabilities that are required to perform garbage collection 132.

All of this is evident for example in the decades of technical advances in garbage collection technology. Those advances would be pointless, rather than being praised and pursued, if garbage collection was routinely done by mental processes or on paper alone. It is not, and it cannot be.

Computing system memory garbage collection 132 and garbage collectors 214 are parts of computing technology. Hence, the garbage collection 132 and garbage collector 214 improvements described herein, such as functionality 204, are improvements to computing technology.

Different embodiments provide different technical benefits or other advantages in different circumstances, and particular technical advantages follow from particular features or feature combinations, as noted at various points herein. Any generic or abstract aspects are integrated into a practical application such as a kernel garbage collector 214, a language runtime garbage collector 214, or another process garbage collector 214.

Some embodiments described herein address technical challenges of computer technology, and more particularly technical challenges arising in the use of garbage collectors 214. Improvements in garbage collector functionality lead to improvements in the performance, useability, security, and maintainability of software whose execution utilizes—and often depends on—the improved garbage collector functionality.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to optimize garbage collection for memory overcommitment scenarios, how to improve the accuracy of memory usage estimates, how to reduce the risk of running out of memory, and how to improve the efficiency and effectiveness of garbage collectors and garbage collections. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

ADDITIONAL COMBINATIONS AND VARIATIONS

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill in the art will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

ACRONYMS, ABBREVIATIONS, NAMES, AND SYMBOLS

Some acronyms, abbreviations, names, and symbols are defined below. Others terms are defined elsewhere herein, or do not require definition here in order to be understood by one of skill in the art.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
MB or mb: megabytes
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

"Garbage collection" and "garbage collector" are each abbreviated herein as "GC". Garbage collection is a computational activity, and a garbage collector is software, so one will understand from context whether a particular instance of "GC" refers to garbage collection, or to a garbage collector, or to either, or to both. However, GC is presumed to mean garbage collection unless otherwise indicated.

Although it is convenient to speak in terms of a k-limit or other value being exceeded (in the higher or lower sense), this is functionally equivalent to meeting or exceeding a slightly different threshold in most cases. As an example, for integers x, stating that x exceeds 99 is equivalent to stating that x meets or exceeds 100 when exceeding means higher than, and stating that x exceeds 1 is equivalent to stating that x meets or exceeds zero when exceeding means lower than. Exceeds is presumed herein to mean exceeds in the higher sense, that is, "x exceeds y" presumptively means "x is greater than y".

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., $\sin(x)$) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" 124 is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Knowledgeable persons will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

Technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Garbage collector control operations such as prioritizing 302 garbage collection based on multiple kinds of environments 208 and 210, checking a local memory usage 716 for significance 714, setting a thread scheduling priority 632, creating a container or other memory isolation unit 710, measuring garbage collection performance 732, and many other operations discussed herein (whether recited in the Figures or not), are understood to be inherently digital. A human mind cannot interface directly with a CPU or other processor, or with RAM or other digital storage, to read and write the necessary data to perform the garbage collection control steps 900 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

This disclosure discusses various data values and data structures, which reside in a memory (RAM, disk, etc.), thereby configuring the memory. This disclosure also discusses various algorithmic steps which are to be embodied in executable code in a given implementation, and such code also resides in memory and effectively configures any general-purpose processor which executes it, thereby transforming it from a general-purpose processor to a special-purpose processor which is functionally special-purpose hardware.

Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as adjusting, allocating, ascertaining, assigning, calculating, changing, collecting, compacting, controlling, decreasing, determining, executing, getting, increasing, marking, measuring, obtaining, pausing, performing, prioritizing, scheduling, setting, specifying, sweeping, switching, traversing, triggering, utilizing (and adjusts, adjusted, allocates, allocated, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe items by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware

102 computer system, also referred to as a "computational system" or "computing system", and when in a network may be referred to as a "node"

104 users, e.g., user of an enhanced system 202

106 peripheral device

108 network generally, including, e.g., LANs, WANs, software-defined networks, clouds, and other wired or wireless networks

110 processor or set of processors or processor core; includes hardware

112 computer-readable storage medium, e.g., RAM, hard disks

114 removable configured computer-readable storage medium

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers; also refers to an execution engine such as a language runtime

122 software tools, software applications; computational

124 process, in the computing science sense; presumed to be a memory managed (i.e., garbage collected) process if not specified otherwise

126 display screens, also referred to as "displays"

128 computing hardware not otherwise associated with a reference number 106, 108, 110, 112, 114

132 garbage collection (GC) computational activity

134 garbage collection control computational activity; garbage collection controller (a.k.a. GC control); computational

136 cloud, also referred to as cloud environment or cloud computing environment

138 heap; an example of managed memory; digital

202 enhanced computing system, i.e., system 102 enhanced with garbage collector control functionality 204 as taught herein

204 garbage collector control functionality (also referred to as or encompassing "garbage collection functionality", "mixed environment pressures GC response functionality", "mixed environment (i.e., local and global) pressures response (e.g., prioritization) functionality", or "garbage collector thread prioritization functionality"), e.g., software or specialized hardware which performs or is configured to perform steps 804 and 302, or steps 908 and 302, or steps 914 and 302, or steps 916 and 302, or any software or hardware which performs or is configured to perform a novel method 900 or a computational garbage collection activity first disclosed herein

206 local memory pressure 306 or global memory pressure 304; if "pressures" plural then denotes local memory pressure 306 and global memory pressure 304

208 local garbage collection or memory usage environment in a computing system, e.g., an isolation unit such as a container, pod, cgroup, or job object within a larger global environment

210 global garbage collection or memory usage environment in a computing system

212 machine, e.g., device 101 or virtual machine

214 garbage collector; software which performs garbage collection 132

302 prioritize garbage collection (GC), by performing a GC (a.k.a. executing a GC), postponing or canceling a scheduled GC, making GC performance priority 742 high 744 or low 746, setting a GC thread scheduling priority 632, or altering the likelihood or timing of a GC based at least in part on pressures 306 in two kinds of environment (i.e., local and global); also referred to as making a priority 742 or setting a priority 742; computational activity

304 global memory pressure or global memory usage, also referred to as global pressure or global usage; digital

306 local memory pressure or local memory usage, also referred to as local pressure or local usage; digital

308 local low threshold; digital

310 local high threshold; digital

312 global low threshold; digital

314 global high threshold; digital

316 machine max capacity, also referred to as maximum volatile memory capacity of the machine or total memory capacity available on a machine or max usable amount for the machine or machine's capacity or RAM capacity for the machine; digital

318 interface generally in a computing system; computational, digital

402 low pressure zone, or state of low pressure; digital

404 high pressure zone, or state of high pressure; digital

406 local environment's volatile memory

408 zero memory pressure in local environment

410 max pressure in local environment, also referred to as max amount of volatile memory in local environment or local max amount of memory or max amount of usable volatile memory of a local environment or max 410; digital

502 global environment's volatile memory

504 zero memory pressure in global environment

600 garbage collection thread composition, as represented in a computing system; in some embodiments thread count is an aspect of thread composition 600; in some embodiments, thread count is the only aspect of thread composition 600 which is monitored or controlled by a composition controller 302 but in some other embodiments one or more additional aspects of thread composition are also monitored or controlled, such as: a number 602 of allocation threads 606, a number 608 of GC compacting threads 612, a number 614 of GC marking threads 618, a number 620 of GC sweeping threads 624, a number 626 of GC threads in total, or an amount 630 of allocated memory per GC thread that triggers garbage collection

602 digital count of GC allocation threads or process 124 allocation threads or both; whether suspended threads are counted depends on the embodiment

604 allocation computational activity during memory management, or a result thereof in a computing system

606 allocation thread; thread 628 which performs, enables, or otherwise facilitates allocation 604

608 digital count of GC compacting threads; whether suspended threads are counted depends on the embodiment

610 compacting GC computational activity during memory management, or a result thereof in a computing system

612 compacting thread; thread 628 which performs, enables, or otherwise facilitates compacting 610

614 digital count of GC marking threads; whether suspended threads are counted depends on the embodiment

616 marking GC computational activity during memory management, or a result thereof in a computing system

618 marking thread; thread 628 which performs, enables, or otherwise facilitates marking 616

620 digital count of GC sweeping threads; whether suspended threads are counted depends on the embodiment 622 sweeping GC computational activity during memory management, or a result thereof in a computing system 624 sweeping thread; thread 628 which performs, enables, or otherwise facilitates sweeping 622

626 digital count of GC threads 628 of any kind; whether suspended threads are counted depends on the embodiment 628 thread, in the computing science sense; presumed to be a GC thread if not specified otherwise 630 trigger value for performing a garbage collection, e.g., amount of managed heap allocated or amount of managed heap available for allocation; digital; also referred to as a threshold or an amount 632 scheduling priority of a GC thread; digital; utilized for thread scheduling by a scheduler which is a kernel 120 component 702 sum of high thresholds; digital 704 container pod; digital and computational 706 container; digital and computational 708 cgroup, e.g., in Linux® environments (mark of Linus Torvalds); digital and computational 710 memory isolation unit; digital and computational 712 job object, e.g., in Windows® environments (mark of Microsoft Corporation); digital and computational 714 local environment contribution measure 716 significance threshold, also referred to as contribution significance; also refers to a contribution 716 which is significant; digital 716 local environment contribution measure, also referred to as contribution measure; digital 718 frequency of garbage collection, e.g., frequency of process 124 pauses to perform GC, or frequency of particular GC operation such as compacting 610; digital 720 digital state of volatile memory usage, or computational activity of using volatile memory 722 volatile memory availability, e.g., amount of memory not currently allocated; digital 724 out-of-memory error, also referred to as OOM; computing event 726 loaded module in volatile memory, or amount of memory allocated to hold loaded module (a.k.a. loaded module value or loaded module usage value or use by a loaded library); digital 728 volatile memory used by GC (a.k.a. separate memory region that is used by the GC itself), or amount of volatile memory used by GC (a.k.a. garbage collector usage value); digital 730 linear calculation, i.e., calculation which involves no exponential power greater than 1 or less than 1, or defines a straight line when graphed, or both 732 GC performance, as represented in a computing system; measured in terms of any computational resource 740

734 metric of GC performance, e.g., pause frequency, allocation rate, garbage-collected process 124 throughput, heap size; computational 736 metric 734 value; computational result, digital 738 virtual machine; computational 740 computational resource, e.g., execution time, processor cycles, memory, bandwidth, electric power 742 GC execution priority, also referred to a GC performance priority or GC priority, as represented in a computing system which includes volatile memory managed at least in part by garbage collection; digital 744 high priority 742; digital 746 low priority 742; digital 748 normal priority 742; digital 800 flowchart; 800 also refers to garbage collection methods that are illustrated by or consistent with the FIG. 8 flowchart 802 computationally determine one or more memory pressure thresholds shown in FIG. 4 or FIG. 5; also referred to a setting a threshold 804 computationally get local and global memory pressures, e.g., from kernel or memory management API 900 flowchart; 900 also refers to garbage collection methods that are illustrated by or consistent with the FIG. 9 flowchart, which incorporates the FIG. 8 flowchart and other steps taught herein 902 computationally utilize a sum of local environment memory usages 904 computationally switch between compacting 610 GC and sweeping 622 GC 906 computationally change GC frequency 908 computationally determine a local contribution 716

910 computationally ascertain whether a threshold is exceeded 912 computationally set a threshold as a percentage of a value 914 computationally assign a garbage collector usage value 728

916 computationally assign a loaded module usage value 726

918 computationally utilize scaling to get a memory pressure 920 computationally utilize a linear calculation to determine a memory pressure threshold 922 computationally obtain a GC performance metric value 924 computationally change a trigger 630

926 computationally change a scheduling priority 632

928 computationally change (a.k.a. adjust) a garbage collection thread composition; computational activity or result thereof in a computing system, e.g., by creating, starting, suspending, stopping, or terminating a GC thread 628, or by changing a computational characteristic of a GC thread such as its priority 632, its available computational resources such as a core 110 or memory 728 for the GC thread's own usage, its assigned portion of the heap 138 that it manages as part of the GC 132, its trigger 630 to perform a garbage collection, or by a combination of such operations 930 computationally schedule a garbage collection execution 932 computationally perform a garbage collection execution, e.g., by marking, sweeping, compacting, or otherwise trimming a heap 138

934 any step or item discussed in the present disclosure that has not been assigned some other reference numeral; 934 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments control 134 garbage collection 132 priority 742 based on both a local memory pressure 306 and a global memory pressure 304. The local pressure 306 represents volatile memory usage 720 in a container 706, pod 704, cgroup 708, job object 712, or other isolation unit 710 residing on a machine 212. The global pressure 304 represents volatile memory usage 720 in the machine 212 overall. The machine 212 is a device 101 or a virtual machine 738 containing one or more isolation units 710. Each isolation unit 710 has a low threshold 308 and a high threshold 310, and the machine 212 has its own low threshold 312 and its own high threshold 314. Garbage collection execution priority 742 is set to low 746, normal 748, or high 744, depending on the memory pressures 206 and the thresholds 308, 310, 314, and in some cases also 312. By basing garbage collection 132 timing and performance on both local pressure 306 and global pressure 304, embodiments optimize garbage collection 132 efficiency, especially in memory overcommitment scenarios.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Implementation details of a given embodiment may pertain to specific code, such as specific thresholds, comparisons, specific kinds of platforms or programming languages or architectures, specific scripts or other tasks, and specific computing environments, and thus need not appear in every embodiment. Program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, note that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not necessary to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method performed by a computing system to perform memory garbage collection based on different memory pressures, the method comprising:

determining a local low threshold, the local low threshold being a nonzero low memory pressure threshold of a local environment, the local environment residing in a machine of a computing system, the local environment having a maximum amount of memory that is less than a maximum volatile memory capacity of the machine;

determining a local high threshold, the local high threshold being a high memory pressure threshold of the local environment, the local high threshold greater than or equal to the local low threshold;

determining a global low threshold, the global low threshold being a nonzero low memory pressure threshold of the machine;

determining a global high threshold, the global high threshold being a high memory pressure threshold, the global high threshold greater than the global low threshold; and prioritizing garbage collection within the local environment based on the local low threshold, the local high threshold, the global low threshold, the global high threshold, a local environment memory pressure representing volatile memory usage in the local environment, and a global memory pressure representing volatile memory usage in the machine.

2. The method of claim 1, wherein prioritizing the garbage collection comprises:

switching between a compacting garbage collection and a sweeping garbage collection.

3. The method of claim 1, wherein prioritizing the garbage collection comprises:

changing a garbage collection frequency.

4. The method of claim 1, further comprising:

determining a local environment contribution measure, the local environment contribution measure representing an amount of memory usage by the local environment or an amount of local environment memory availability relative to an amount of global memory usage or an amount of global memory availability;

wherein prioritizing the garbage collection comprises:

determining that the global memory pressure exceeds the global high threshold;

determining that the local environment contribution measure is below a significant contribution threshold; and based on determining that the global memory pressure exceeds the global high threshold and determining that the local environment contribution measure is below a significant contribution threshold, making garbage collection within the local environment a low priority.

5. The method of claim 1, further characterized by at least one of the following:

determining the local low threshold comprises setting the local low threshold to a percentage of a maximum amount of memory usable in the local environment without incurring an out-of-memory error;

determining the local high threshold comprises setting the local high threshold to a percentage of a maximum amount of memory usable in the local environment without incurring an out-of-memory error;

determining the global low threshold comprises setting the global low threshold to a percentage of a maximum amount of volatile memory capacity of the machine; or determining the global high threshold comprises setting the global high threshold to a percentage of a maximum amount of volatile memory capacity of the machine.

6. The method of claim 1, further characterized by at least one of the following:

determining the local low threshold comprises assigning a garbage collector usage value which represents memory usage by a garbage collector as opposed to usage of garbage collected memory by a process other than the garbage collector, and setting the local low threshold based in part on the garbage collector usage value;

determining the local low threshold comprises assigning a loaded module usage value which represents memory usage to hold a loaded module in volatile memory, and setting the local low threshold based in part on the loaded module usage value;

determining the local high threshold comprises assigning a garbage collector usage value which represents memory usage by a garbage collector as opposed to usage of garbage collected memory by a process other than the garbage collector, and setting the local high threshold based in part on the garbage collector usage value; or determining the local high threshold comprises assigning a loaded module usage value which represents memory usage to hold a loaded module in volatile memory, and setting the local high threshold based in part on the loaded module usage value.

7. The method of claim 1, wherein determining the local high threshold comprises:

determining the local high threshold according to a linear calculation based on at least the local low threshold, a maximum amount of memory usable in the local environment without incurring an out-of-memory error, the global low threshold, the global high threshold, and the global memory pressure.

8. The method of claim 1, comprising:

scaling a local memory pressure based on at least the global memory pressure.

9. The method of claim 1, wherein at least one of determining the local low threshold, determining the local high threshold, determining the global low threshold, or determining the global high threshold comprises:

obtaining a garbage collector performance metric value and setting at least one of the local low threshold, the local high threshold, the global low threshold, or the global high threshold based at least in part on the garbage collector performance metric value.

10. The method of claim 1, further comprising at least one of:

performing a garbage collection within the local environment in response to a result of the prioritizing; or scheduling a garbage collection within the local environment in response to a result of the prioritizing.

11. The method of claim 1, wherein prioritizing the garbage collection comprises at least one of:

decreasing a garbage collection trigger threshold;

increasing a scheduling priority of a garbage collection thread; or adjusting a garbage collection thread composition.

12. A computing system which is configured to perform memory garbage collection based on different memory pressures, the computing system comprising:

a digital memory;

a processor set including at least one processor, the processor set in operable communication with the digital memory;

a local low threshold, the local low threshold being a nonzero low memory pressure threshold of a local environment, the local environment residing in a machine of the computing system;

a local high threshold, the local high threshold being a high memory pressure threshold of the local environment, the local high threshold greater than the local low threshold;

a global low threshold, the global low threshold being a nonzero low memory pressure threshold of the machine;

a global high threshold, the global high threshold being a high memory pressure threshold, the global high threshold greater than the global low threshold;

a garbage collector control; and wherein the local low threshold, the local high threshold, the global low threshold, the global high threshold, and the garbage collector control reside in and configure the memory;

wherein upon execution by the processor, the garbage collector control prioritizes garbage collection within the local environment as follows:

making garbage collection within the local environment a low priority when local environment volatile memory usage is below the local high threshold and global volatile memory usage is below the global low threshold, and making garbage collection within the local environment a high priority when local environment volatile memory usage is above the local high threshold or global volatile memory usage is above the global high threshold or both.

13. The computing system of claim 12, wherein multiple local environments are running on the machine, a sum of local high thresholds of the multiple local environments is greater than a maximum volatile memory capacity of the machine, and a sum of memory usages of the multiple local environments satisfies one of the following conditions:

the sum is less than or equal to the global high threshold; or the sum is greater than the global high threshold and is less than or equal to the maximum volatile memory capacity of the machine.

14. The computing system of claim 12, wherein the local environment comprises:

a container;

a pod of containers;

a memory isolation unit specified by a cgroup; or a memory isolation unit specified by a job object.

15. The computing system of claim 12, further characterized by the following:

a local environment contribution measure resides in and configures the memory, the local environment contribution measure representing an amount of memory usage by the local environment or an amount of local environment memory availability relative to an amount of global memory usage or an amount of global memory availability; and the garbage collector control prioritizes garbage collection in part by making garbage collection within the local environment a high priority when global memory usage is above the global high threshold and the local environment contribution measure exceeds a significant contribution threshold.

16. A computer-readable storage device configured with data and instructions which upon execution by a processor cause a computing system to perform operations, the operations comprising:

determining a local low threshold, the local low threshold being a nonzero low memory pressure threshold of a local environment, the local environment residing in a machine of a computing system;

determining a local high threshold, the local high threshold being a high memory pressure threshold of the local environment, the local high threshold greater than or equal to the local low threshold;

determining a global high threshold, the global high threshold being a high memory pressure threshold, the global high threshold greater than or equal to a global low threshold; and prioritizing garbage collection within the local environment based on the local low threshold, the local high threshold, the global high threshold, a local environment memory pressure representing volatile memory usage in the local environment, and a global memory pressure representing volatile memory usage in the machine.

17. The storage device of claim 16, comprising:

determining at least one of the local low threshold or the local high threshold based on at least the global memory pressure.

18. The storage device of claim 16, comprising:

determining at least one of the local low threshold or the local high threshold based on at least a garbage collector usage value which represents memory usage by a garbage collector as opposed to usage of garbage collected memory by a process other than the garbage collector.

19. The storage device of claim 16, comprising:

determining a respective local low threshold and a respective local high threshold for each of at least three local environments, each local environment residing in the machine, and prioritizing garbage collection within each of the at least three local environments, a sum of the local high thresholds exceeding the global high threshold.

20. The storage device of claim 16, further characterized by at least one of the following:

determining the local low threshold comprises setting the local low threshold to a value which is in a range from fifty percent to eighty percent of a maximum amount of memory usable in the local environment without incurring an out-of-memory error; or determining the local high threshold comprises setting the local high threshold to a value which is in a range from seventy percent to ninety-five percent of a maximum amount of memory usable in the local environment without incurring an out-of-memory error.

\* \* \* \* \*